United States Patent [19]

Nagaoka

[11] 3,810,570

[45] May 14, 1974

[54] TAPE DRIVING MECHANISM IN RECORDING AND/OR REPRODUCING APPARATUS

[75] Inventor: Tadashi Nagaoka, Nishinomiya, Japan

[73] Assignee: Matsushita Electric Industrial Co., Ltd., Osaka, Japan

[22] Filed: Nov. 30, 1972

[21] Appl. No.: 311,000

[30] Foreign Application Priority Data

Dec. 1, 1971 Japan .............................. 46-113399

[52] U.S. Cl. .............................................. 226/176
[51] Int. Cl. ........................................... B65h 17/22
[58] Field of Search ........... 226/176, 177, 186, 187; 74/479

[56] References Cited

OTHER PUBLICATIONS

IBM Technical Disclosure Bulletin, Vol. 14, No. 1, June 1971, "Pinch Roller Actuation," Jaques.

*Primary Examiner*—Allen N. Knowles
*Attorney, Agent, or Firm*—Stevens, Davis, Miller & Mosher

[57] ABSTRACT

A pinch roller mechanism for driving a tape-like article, comprising a pinch roller arm having a pinch roller rotatably mounted thereon and being urged to move the pinch roller away from a capstan, and an actuating member provided adjacent said pinch roller arm and reciprocated with a predetermined stroke, said actuating member at an end of its stroke engaging said pinch roller arm through a projection or projections having a curved edge, thereby causing said pinch roller arm to make a pivotal movement against the biasing force.

7 Claims, 8 Drawing Figures

TAPE DRIVING MECHANISM IN RECORDING AND/OR REPRODUCING APPARATUS

This invention relates to driving mechanisms for driving a tape-like recording medium, such as a magnetic tape, used in the recording and/or reproducing apparatus.

In magnetic recording and/or reproducing apparatus operable with a tape-like recording medium e.g. apparatus using a magnetic tape, it is known to use a mechanism for driving said magnetic tape, which comprises a rotary body called pinch roller and means for urging said rotary body or pinch roller into pressure contact with a capstan through the magnetic tape.

In such a pinch roller mechanism, means is provided to move the pinch roller away from the capstan, to facilitate mounting or demounting of the magnetic tape in or from the apparatus or to provide for driving of the tape by other driving mechanism at the time of rewinding or fast forward operation of the tape.

The present invention consists in improvements in the pinch roller mechanism of the type described, and an object thereof is to decrease the stroke of movement of a sliding strip which initiates the movement of the pinch roller into contact with or away from the capstan.

Another object of the invention is to provide a pinch roller mechanism which is so constructed that the pressure of contact between the pinch roller and capstan can easily be adjusted.

Still another object of the invention is to provide a pinch roller mechanism which is so constructed that a stable pressure of contact can be obtained between the pinch roller and capstan.

Still another object of the invention is to provide a pinch roller mechanism which is adapted for use with a plunger used as a driving source for the pinch roller.

Other objects, features and advantages of the invention will become apparent from the following detailed description taken in conjunction with the accompanying drawings.

Figure 1:
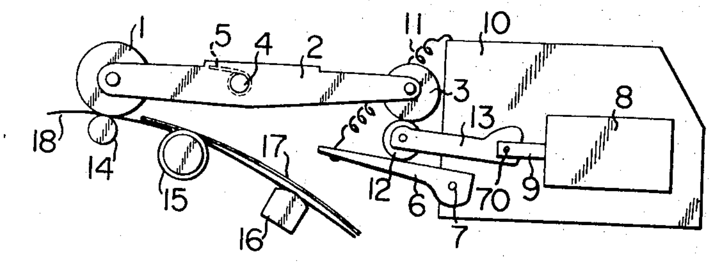
FIG. 1 is a plan view showing an embodiment of the present invention.

With reference to FIG. 1, a pinch roller mechanism according to the invention comprises a pinch roller 1, a pinch roller arm 2 having said pinch roller 1 rotatably mounted at one end thereof, a roller 3 rotatably mounted at the other end of said pinch roller arm 2 and a spring 5 urging said pinch roller arm 2 to make a pivotal movement in a clockwise direction about a pivot pin 4.

The pinch roller mechanism further comprises a guide strip 6 pivotally mounted on a pin 7 at one end, a plunger 8 actuated in association with a recording or reproducing operation and having a plunger shaft 9, a mounting plate 10 on which said plunger 8 is fixedly mounted, a spring 11 having one end anchored to said mounting plate 10 and the other end to the other end of said guide strip 6 for preventing said guide strip from making a pivotal movement in a counterclockwise direction about the pin 7, the spring constant of said spring 11 being larger than that of said spring 5, a roller arm 13 having one end pivotally connected to the outer end of said plunger shaft 9 by a pivot pin 70 and a roller 12 rotatably mounted at the other end of said roller arm 13.

The arrangement is such that, when the plunger 8 is actuated, the roller arm 13 is shifted and the roller 12 mounted on said roller arm 13 is moved substantially parallel to the pinch roller arm 2 between the roller 3 and guide strip 6 in contact with both of said roller and guide strip.

Reference numeral 14 designates a capstan positioned in the locus of pivotal movement of the pinch roller 1, 15 a tape guide roller, 16 a magnetic head, 17 a tape guide and 18 a magnetic tape.

The pinch roller mechanism constructed as described above operates in the following manner:

While the apparatus is in a phase other than recording or reproduction, the plunger 8 is held inactive and the roller 12 is held in a position spaced apart from or slightly contacting with the roller 3 and guide strip 6. Therefore, the pinch roller 1 is spaced apart from the capstan 14 under the biasing force of the spring 5. When the apparatus is shifted into a recording or reproduction phase, the plunger 8 is actuated and the roller 12 is pulled towards said plunger through the plunger shaft 9 and roller arm 13 while pushing the roller 3 upwardly, with the result that the pinch roller is pressed against the capstan 14 with a suitable force and the magnetic tape pinched between said pinch roller and capstan is driven at a constant speed (see FIG. 1). In this case, the friction between the rollers 12 and 3 is small because both of said rollers rotate. The pressure of contact between the pinch roller 1 and capstan 14 is suitably set by the spring 11 which has a large spring constant as stated above, and the guide strip 6 makes substantially no movement, relative to the movements of the roller 3 and pinch roller arm 2. Now, when the apparatus is relieved from the recording or reproduction phase, the roller 12 is relieved from restrainment by the plunger 8 and returned to its original position by the pinch roller arm 2 which is returning to its original position under the biasing force of the spring 5.

According to this mechanism, the stroke of movement of the plunger shaft 9, necessary for moving the pinch roller 1 a predetermined distance away from the capstan 14, is determined by the ratio of the distance between the pivot pin 4 and pinch roller 1 and the distance between the pivot pin 4 and roller 3, and the radii of the rollers 3 and 12. Therefore, it will be understood that the stroke of movement of the plunger shaft 9 can be made short by properly selecting the radii of the two rollers 3 and 12.

In general, the attraction of the plunger 8 is in inverse proportion to the square of the stroke of the plunger shaft 9, so that a short stroke of the plunger piston 9 means that the plunger 8 can be used in the range of its large attraction and hence the size of the plunger 8 can be made small.

Figure 8:
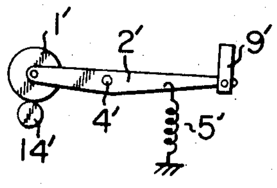
FIG. 8 is a plan view showing a conventional pinch roller mechanism.

This is advantageous in the light of the following disadvantage of a conventional pinch roller mechanism of the type shown in FIG. 8. Namely, in the conventional mechanism, the stroke of the plunger piston 9' has been determined only by the moving distance of a pinch roller 1' and the ratio of the distances between the aforesaid acting points and fulcrum point, so that more restrictions have been imposed on the design conditions and shortening of the plunger piston stroke has been difficult in the actual design.

In the embodiment described above, the guide strip 6 is rendered pivotable and biased by the spring 11, but it may be fixed immovably in the event when the pinch roller 1 is made of an elastic material, such as rubber. In this case, the elasticity of the pinch roller 1 proper is substituted for the biasing force of the spring 11.

Figure 2:
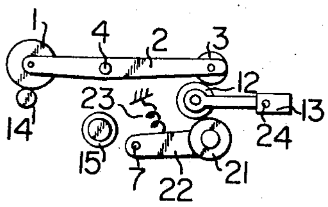
FIGS. 2 and 3 are plan views respectively showing other embodiments of the invention.
Figure 3:
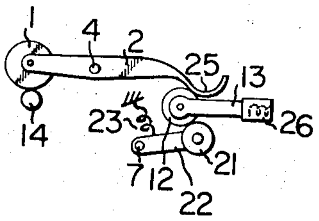

FIGS. 2 and 3 respectively show other embodiments of the pinch roller mechanism according to the invention. In the embodiment shown in FIG. 2, the guide strip 6 in the embodiment of FIG. 1 is substituted by a guide rod 22 having a guide roller 21 rotatably mounted at one end thereof, and roller 3 and pinch roller arm 2 are pushed up incident to movement of the roller arm 13. In this case, the guide rod 22 is biased by a spring 23 having a large spring constant and is substantially immovable, so that the pivoting distance of the pinch roller arm 2 can be varied, not only by the radii of the rollers 3, 12 but also by the radius of the guide roller 21. Further, the position of the roller 12 in the actuated state of the plunger 8 can be adjusted by properly adjusting the length of the roller arm 13 by means of adjusting means including an adjusting screw, and the pressure of contact between the capstan 14 and pinch roller 1 can be adjusted by such adjustment.

Figure 4:
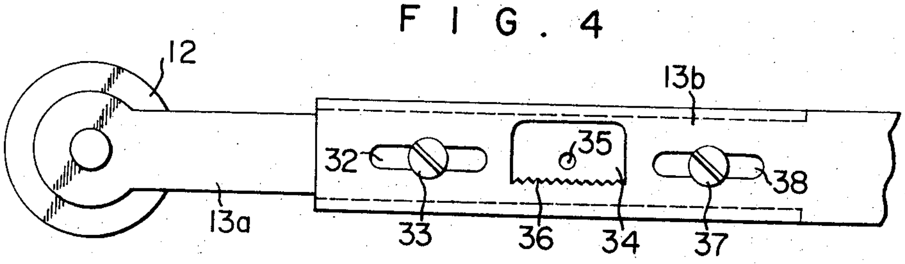
FIG. 4 is a fragmentary plan view showing an embodiment of the essential portion of FIG. 2.

A practical construction of the adjusting means is exemplified in FIG. 4. According to the construction shown in FIG. 4, the roller arm 13 consists of a first roller arm member 13*a* having the roller 12 at one end and a second roller arm member 13*b* telescoped over the other end of said first roller arm member 13*a*. The first roller arm member 13a is provided with adjusting screws 33, 37 which are respectively acrewed into said first roller arm member 13*a* through slots 32, 38 formed in the second roller arm member 13*b*, with their heads exposed to the outside.

It will be understood that the substantial length of the roller arm 13 can be adjusted by sliding the first roller arm member 13*a* into or out of the second roller arm member 13*b*, upon loosening the adjusting screws 33, 37, with said adjusting screws moving in the respective slots 32, 38.

Figure 5:
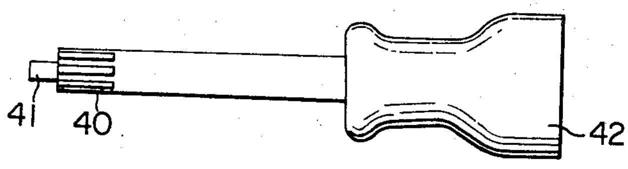
FIG. 5 is a side elevational view of an adjusting tool used in the invention.

At the upper side of the second roller arm member 13b is provided an opening 34, and a rack 36 is formed along one edge of said opening 34 extending in the longitudinal direction of the roller arm. On the other hand, the first roller arm member 13*a* is provided with a hole 35 at a location exposed through the opening 34 of the second roller arm member 13*b*. For adjusting the length of roller arm, the adjusting screws 33, 37 are loosened at first and then the tip end of a driver 42 of the type shown in FIG. 5 is inserted into the hole 35 of the first roller arm member 13a through the opening 34 of the second roller arm member 13b and turned with a pinion gear 40, provided on said driver 42, in meshing engagement with the rack 36 of said second roller arm member 13*b*, to adjust finely the position of the first roller arm member 13*a* relative to the second roller arm member 13*b*. Thus, the length of the roller arm can be adjusted smoothly.

It will be obviously understood that the adjusting means described above can be applied to the embodiment of FIG. 1 and embodiments of FIGS. 3, 7 to be described later.

In the embodiment shown in FIG. 3, the guide strip 6 in FIG. 1 is replaced by the guide rod shown in FIG. 2 and a portion 25 of the pinch roller arm 2 to be engaged by the roller 12 is shaped in an arcuate shape. In this case also, the pivoting distance of the pinch roller arm 2 is determined by the radii of the rollers 12, 21 and the radius of curvature of the arcuate portion 25 of said pinch roller arm. Reference numeral 26 designates a spring having a large spring constant, which is effective for providing the optimum pressure of contact between the pinch roller 1 and capstan 14.

Figure 6:
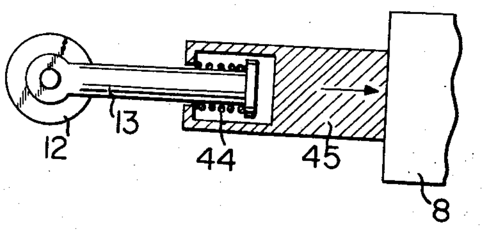
FIG. 6 is a plan view, partially shown in section, of the essential portion of FIG. 3.

The detailed construction at the position of this spring is shown in FIG. 6. The roller arm 13 and an arm 45 operated by the plunger 8 are connected through a spring 44 having a large spring constant, whereby when the arm 45 is pulled in the direction of the arrow by the plunger, it pulls the roller arm 13 in the same direction while compressing the spring 44.

A further embodiment of the invention will be described with reference to FIG. 7. In FIG. 7, when the plunger 8 is energized, the plunger arm 9 is retracted in the direction of the arrow 62, and thus a lever 53 is pulled towards the plunger 8, which is pivotally connected at one end to said plunger arm 9 by a pivot pin 52. Since the other end of the lever 53 is pivotally mounted on a fixed pin 54, said lever 53 moves in the direction of the arrow 63 when pulled as described above. This lever 53 is formed at one end portion with a projection 61 having a curved edge.

On the other hand, a pinch roller arm 56 provided with a roller 55 at one end is pivotally mounted at the other end on a fixed pin 58 and is urged to rotate in a counterclockwise direction by a spring 60, with said roller 55 in pressure contact with the projection 61 of the lever 53.

Figure 7:
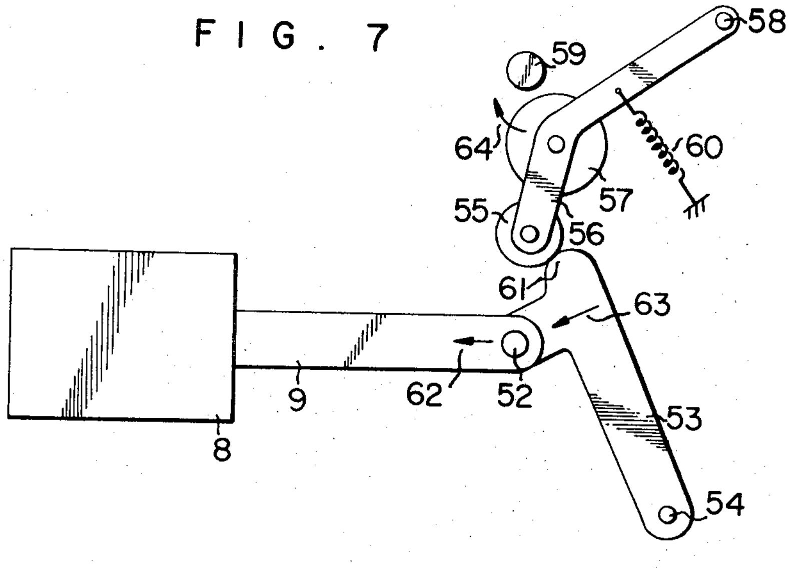
FIG. 7 is a plan view showing still another embodiment of the invention.

Therefore, when the lever 53 is pivoted in the direction of the arrow 63 in the state shown in FIG. 7, the pinch roller arm 56 is caused to make a pivotal movement in the direction of the arrow 64 against the biasing force of the spring 60, and thus a pinch roller 57 carried on said pinch roller arm 56 is brought into pressure contact with a capstan 59. Upon deenergization of the plunger 8, the pinch roller arm 56, the lever 53 and the plunger arm 9 return to their original positions under the biasing force of the spring 60.

While a plunger is used in each of the embodiments described and illustrated herein for operating the actuating member for actuating the pinch roller arm, it will be understood that other means, such as a manually operated lever, may alternatively be used for the same purpose.

What is claimed is:

1. A tape driving mechanism in recording and/or reproducing apparatus, comprising a pinch roller arm pivotable about a point, a pinch roller rotatably mounted at one end of said pinch roller arm, a capstan positioned in the locus of movement of said pinch roller caused incident to the pivotal movement of said pinch roller arm, biasing means for biasing said pinch roller arm to make a pivotal movement in a direction to move said pinch roller away from said capstan, a guide member extending substantially parallel to said pinch roller arm, a curved projection provided at least at one of the confronting faces of said guide member and the other end of said pinch roller arm, a roller movable between said pinch roller arm and said guide member while being in contact therewith, a longitudinally reciprocatively movable actuating member having said roller rotatably mounted thereon, and driving means connected to said actuating member causing a longitudinal movement of said actuating member.

2. A tape driving mechanism according to claim 1, wherein means is provided to adjust the stroke of longitudinal reciprocating movement of said actuating member.

3. A tape driving mechanism according to claim 1, wherein said guide member is pivotable about a point and there is provided second biasing means for biasing said pinch roller arm in a direction opposite to the direction in which said pinch roller arm is biased by said first biasing means.

4. A tape driving mechanism according to claim 1, wherein said curved projection is a roller.

5. A tape driving mechanism according to claim 1, wherein said curved projection is provided on both of said pinch roller arm and guide member.

6. A tape driving mechanism for recording and/or reproducing apparatus, comprising: a pinch roller arm pivotable about a point; a pinch roller rotatably mounted on said pinch roller arm and pivotable therewith; a capstan positioned in the locus of pivotal movement of said pinch roller; biasing means for biasing said pinch roller arm for pivotal movement in a direction to move said pinch roller away from said capstan; actuating means reciprocally movable with a predetermined stroke adjacent said pinch roller arm, said actuating means comprising two levers slidable longitudinally relative to each other in superimposed relation, one of said levers being provided with an opening having a longitudinal edge and being formed with a rack along the longitudinal edge, the other of said levers being provided with a hole at a location exposed through said opening for receiving an adjusting driver which is provided with a pinion engageable with said rack; engaging portions respectively provided at the confronting faces of said actuating means and one end of said pinch roller arm, at least one of said engaging portions being a curved projection; and driving means for causing the reciprocating movement of said actuating means, with the engaging portions of said actuating means and pinch roller being in engagement with each other, whereby said pinch roller arm is caused to make a pivotal movement against the biasing force of said biasing means.

7. A tape driving mechanism for recording and/or reproducing apparatus, comprising: a pinch roller arm povotable about a point; a inch roller rotatably mounted on said pinch roller arm and pivotable therewith; a capstan positioned in the locus of pivotal movement of said pinch roller; biasing means for biasing said pinch roller arm for pivotal movement in a direction to move said pinch roller away from said capstan; actuating means reciprocally movable with a predetermined stroke adjacent said pinch roller arm; engaging portions respectively provided at the confronting faces of said actuating means and one end of said pinch roller arm, the engaging portion provided on said pinch roller arm being a curved projection; and driving means for causing the reciprocating movement of said actuating means; said actuating means comprising a lever having one end pivotally mounted on a fixed pin and the other end pivotally connected to said driving means, said lever being provided at said other end with a curved engaging portion for engagement with the curved projection provided on said pinch roller arm; said actuating means being caused to make a reciprocating movement, with the engaging portions of said actuating means and pinch roller being in engagement with each other, whereby said pinch roller arm is caused to make a pivotal movement against the biasing force of said biasing means.

* * * * *